United States Patent
Schaaf, III et al.

(10) Patent No.: US 9,071,687 B1
(45) Date of Patent: *Jun. 30, 2015

(54) OUTBOUND TIME WINDOW INDICATORS

(75) Inventors: Bernard William Schaaf, III, Long Valley, NJ (US); Michael Brimshan, Old Bridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/172,381

(22) Filed: Jun. 29, 2011

Related U.S. Application Data

(60) Provisional application No. 61/360,255, filed on Jun. 30, 2010.

(51) Int. Cl.
| | | |
|---|---|---|
| *H04M 3/00* | (2006.01) | |
| *H04M 5/00* | (2006.01) | |
| *H04M 3/51* | (2006.01) | |
| *H04M 3/523* | (2006.01) | |

(52) U.S. Cl.
CPC ............ *H04M 3/5158* (2013.01); *H04M 3/523* (2013.01)

(58) Field of Classification Search
CPC .. H04M 3/5158; H04M 3/523; H04M 3/5232
USPC ............. 379/266.03, 266.06, 266.07, 266.08
See application file for complete search history.

(56) References Cited

U.S. PATENT DOCUMENTS

| | | | | |
|---|---|---|---|---|
| 5,815,566 | A * | 9/1998 | Ramot et al. | 379/210.01 |
| 6,141,412 | A * | 10/2000 | Smith et al. | 379/266.03 |
| 7,142,662 | B2 * | 11/2006 | Rodenbusch et al. | 379/266.07 |
| 7,502,460 | B2 * | 3/2009 | Rodenbusch et al. | 379/266.07 |
| 8,611,527 | B1 * | 12/2013 | Schaaf, III | 379/266.07 |
| 2002/0067820 | A1 * | 6/2002 | Benson et al. | 379/265.02 |
| 2011/0116618 | A1 * | 5/2011 | Zyarko et al. | 379/266.07 |

* cited by examiner

*Primary Examiner* — Nafiz E Hoque

(57) ABSTRACT

A system and machine-implemented method for automated communication is presented. Outbound communication time window groups associated with one or more ranges of time valid are identified for initiating an outbound communication. A set of outbound communication time window groups for each of which the current time is within its associated ranges of time is identified. Subsequently, a call record associated with one of the outbound communication time window groups in the set is obtained, and an outbound communication session is initiated to a communication address included in the obtained call record. After an outbound communication session is established, it may be transferred to a live agent. If the outbound communication session has failed however, another outbound communication session may be initiated to the communication address within a later time range.

26 Claims, 5 Drawing Sheets

OUTBOUND TIME WINDOW INDICATORS

RELATED APPLICATIONS

This application claims the benefit of priority to U.S. Provisional Patent Application No. 61/360,255, filed on Jun. 30, 2010, the contents of which are herein incorporated by reference in their entirety.

BACKGROUND

Voice portals are frequently used to answer calls and obtain information from callers. For example, businesses often use voice portals that include interactive voice response (IVR) units to interact with callers and to obtain information from the callers. The IVR systems also are used by businesses to make outgoing calls to customers and/or potential customers. For large businesses, call inbound and outbound call traffic can be quite high, and IVR systems for such high traffic volumes operate to handle calls through a large number of ports or line connections. Management of the call traffic through numerous, but a limited number of, ports, however, raises a variety of issues, particularly where the IVR system handles both in-bound and out-bound calls.

Although a business may be interested in utilizing an IVR system for outbound calls, typically inbound calls, representing customer-initiated calls, are considered a more significant priority, in order to satisfy customer service expectations for customers. Thus, although outbound calls are made on IVR ports unused for inbound calls, generally not all available ports are utilized, thereby leaving ports available to handle inbound calls.

SUMMARY

The disclosed subject matter relates to a machine-implemented method for automated communication including identifying a first plurality of outbound communication time window groups, each outbound communication time window group being associated with one or more ranges of time valid for initiating an outbound communication session for a group of communicants: indentifying a second plurality of outbound communication time window groups, included in the first plurality of outbound communication time window groups, wherein for each of the second plurality of outbound communication time window groups a current time is within one of the ranges of time associated with the outbound communication time window group; obtaining one of a plurality of call records associated with the second plurality of outbound communication time window groups; and initiating an outbound communication session to a communication address included in the obtained call record.

The disclosed subject matter further relates to a system for automated communication, the system comprising: one or more processors; and a machine-readable medium comprising instructions stored therein, which when executed by the processors, cause the processors to perform operations including identifying a first plurality of outbound communication time window groups, each outbound communication time window group-being associated with one or more ranges of time valid for initiating an outbound communication session for a group of communicants; indentifying a second plurality of outbound communication time window groups, included in the first plurality of outbound communication time window groups, wherein for each of the second plurality of outbound communication time window groups a current time is within one of the ranges of time associated with the outbound communication time window group; obtaining one of a plurality of call records associated with the second plurality of outbound communication time window groups; and initiating an outbound communication session to a communication address included in the obtained call record.

The disclosed subject matter also relates to a machine-readable medium comprising instructions stored therein, which when executed by a machine, cause the machine to perform operations including identifying a first plurality of outbound communication time window groups, each outbound communication time window group being associated with one or more ranges of time valid for initiating an outbound communication session for a group of communicants; identifying a second plurality of outbound communication time window groups, included in the first plurality of outbound communication time window groups, wherein for each of the second plurality of outbound communication time window groups a current time is within one of the ranges of time associated with the outbound communication time window group; obtaining one of a plurality of call records associated with the second plurality of outbound communication time window groups; and initiating an outbound communication session to a communication address included in the obtained call record.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
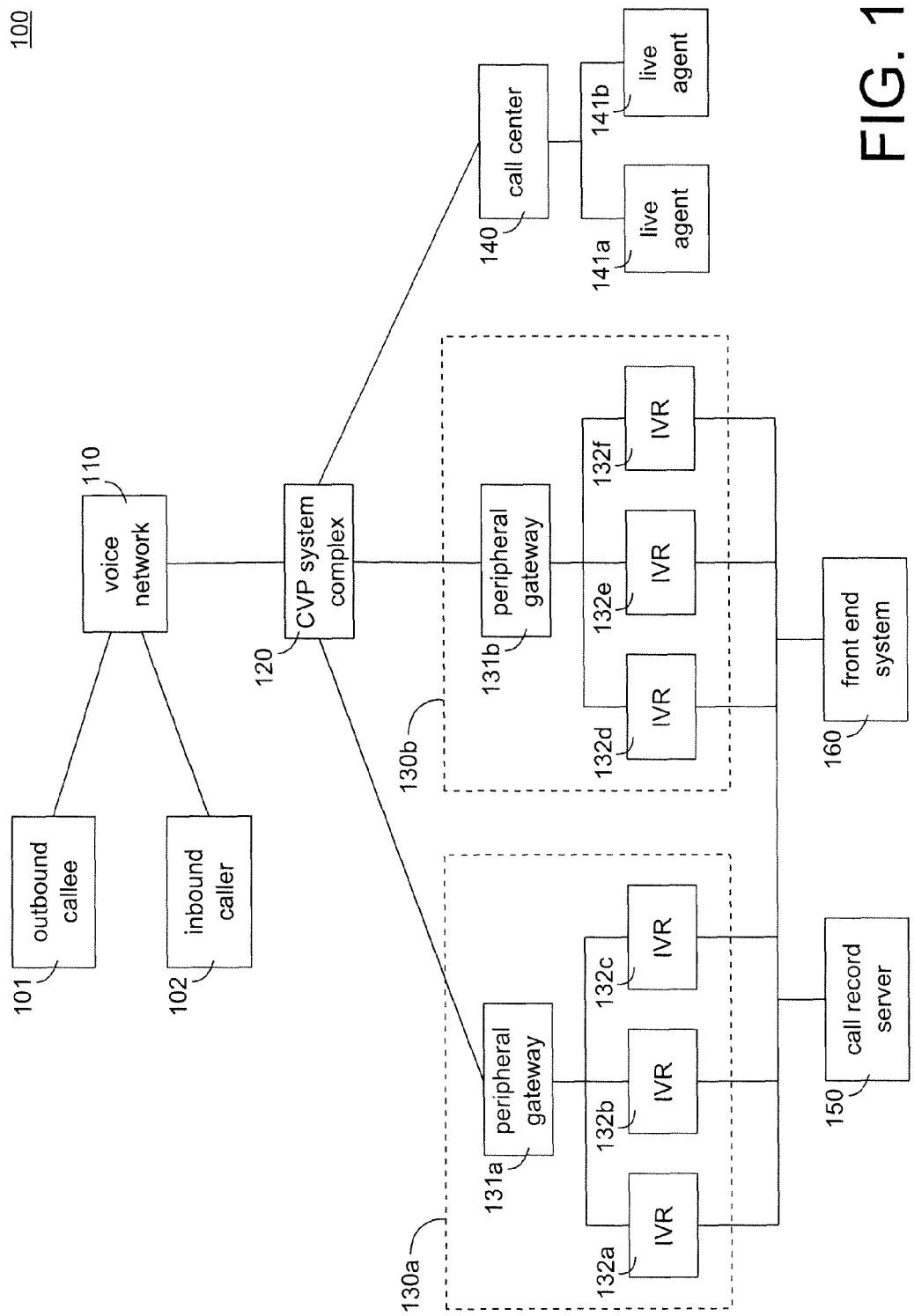
FIG. 1 illustrates an exemplary architecture diagram for the disclosed techniques.

FIG. 1 illustrates an exemplary architecture diagram for the disclosed techniques. Voice network 110 provides voice communication services between parties, such as between inbound caller 102 and outbound callee 101, or between call center 140 and outbound callee 101. Examples of voice network 110 include a landline connection through a public switched telephone network (PSTN), a voice over Internet Protocol (VoIP) call or connection, and a voice call or hybrid voice/data call via other wired or wireless channels. Protocols for interfacing with voice network 110 include, for example, SIP/SS7 phone lines and traditional T1 lines. Ordinarily there will be many more communicants on voice network 110 than illustrated in FIG. 1.

IVR farm 130a, IVR farm 130b, and call center 140 each establish inbound and outbound communication sessions with voice network 110 via CVP system complex 120. An inbound communication session occurs where a communicant on voice network 110, such as inbound caller 102, initiates, via voice network 110, an exchange of communications with one of the IVR systems, such as IVR system 132a. An outbound communication session occurs where one of the IVR systems, such as IVR system 132a, initiates, via voice network 110, an exchange of communications with a communicant on voice network 110, such as outbound callee 101, via voice network 110. Additionally, although a party may initiate a communication session (either inbound or outbound), the communication session might not be established if the other party does not accept the communication session. CVP system complex 120 is associated with one or more addresses on voice network 110. For example, where voice network 110 is a PSTN network, CVP system complex 120 has one or more associated telephone numbers which an inbound caller 102 may use to establish an inbound communication session with CVP system complex 120, and ultimately one or more of the elements behind CVP system complex 120. For an inbound communication session, such as a telephone call initiated by inbound caller 102, CVP system complex 120 routes an inbound communication session to one of IVR farm 130a, IVR farm 130b, and call center 140. In some embodiments, the decision to route an inbound call to IVR farm 130a versus IVR farm 130b may be based upon respective geographic locations of the inbound communicant and IVR farms 130a and 130b, as indicated by respective communication addresses, or the number of communication sessions being handled by each of IVR farm 130a and IVR farm 130b. In some embodiments, a number of communication channels, ports, or lines are allocated between CVP system complex 120 and voice network 110, and these channels, ports, or lines may be switched between handling inbound communication sessions (i.e., sessions initiated by communicants on voice network 110) and outbound communication sessions (i.e., sessions initiated by a system "behind" CVP system complex 120, such as IVR farm 130a, IVR farm 130b, and call center 140. Additionally, where a communication session has been established, such as an outbound communication session between IVR farm 130a and outbound callee 101, CVP system complex 120 is operable to transfer a communication session from one communicant behind CVP system complex 120 to another. For example, once IVR farm 130a has determined outbound callee 101 is a "live" communicant, CVP system complex 120 may reroute the original communication session between IVR farm 130a and outbound callee 101 to be between call center 140 and outbound callee 101, without terminating the communication session.

IVR farm 130a includes peripheral gateway 131a and IVR servers 132a, 132b, and 132c. In some embodiments, IVR servers 132a, 132b, and 132c may be physically collocated. Some embodiments may include more or less IVR servers than illustrated in FIG. In some embodiments, a peripheral gateway may be used for multiple IVR farms; for example, where CVP system complex 120 determines which of the IVR servers to route a new inbound communication session. When an inbound communication session is received by IVR farm 130a, peripheral gateway 131a routes the communication session to one of IVR servers 132a, 132b, and 132c. In some embodiments, a determination of which of the IVR servers peripheral gateway 131a will route a new inbound communication session is based on a number of inbound communication ports available on each IVR server, and/or a number of active inbound communication sessions currently being handled by each IVR server. Peripheral gateway 131a and CVP system complex 120 are responsive to commands received from one another or IVR servers 132a, 132b, and 132c. For example, IVR server 132a may issue a command to CVP system complex 120 to configure a communication port to be assigned for outbound communication. When IVR server 132a determines it should attempt an outbound communication session, it cycles the line, which indicates to peripheral gateway 131a managing the line that the line is no longer in the same state and should not be able to take an inbound call. Shortly thereafter, if conditions are still right to permit a dial out, a message is sent by IVR 132a to peripheral gateway 131a which indicates that the line is busy wall a call and cannot handle a new inbound communication session. In some embodiments the functionality of peripheral gateway 131a may be integrated into CVP system complex 120. In some embodiments, rather than a single CVP system complex 120, the functionality of CVP system complex 120 may be integrated into the peripheral gateways 131 associated with each of the IVR farms.

Figure 3:
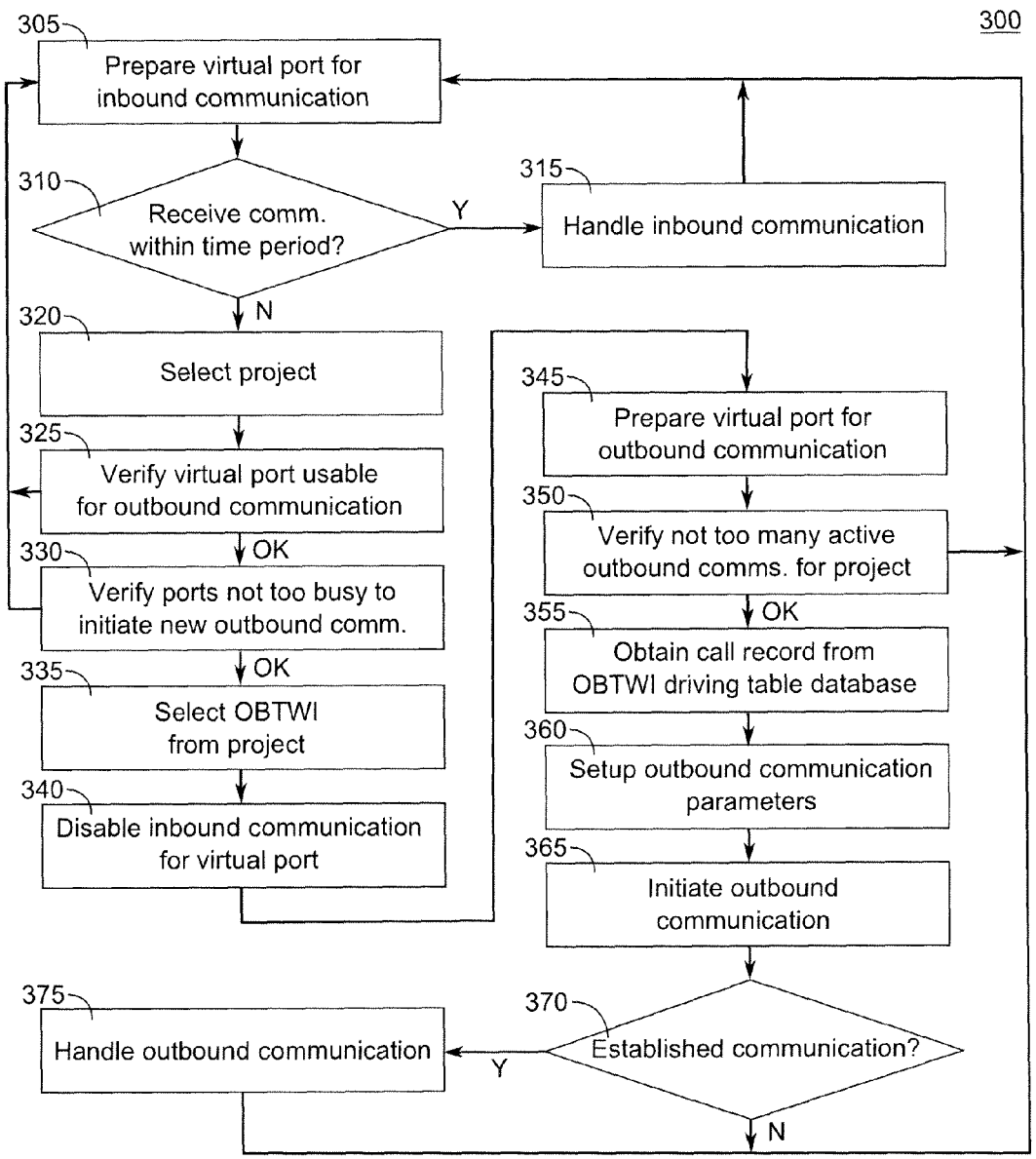
FIG. 3 illustrates a process 300 by which outbound calls are processed.
Figure 4:
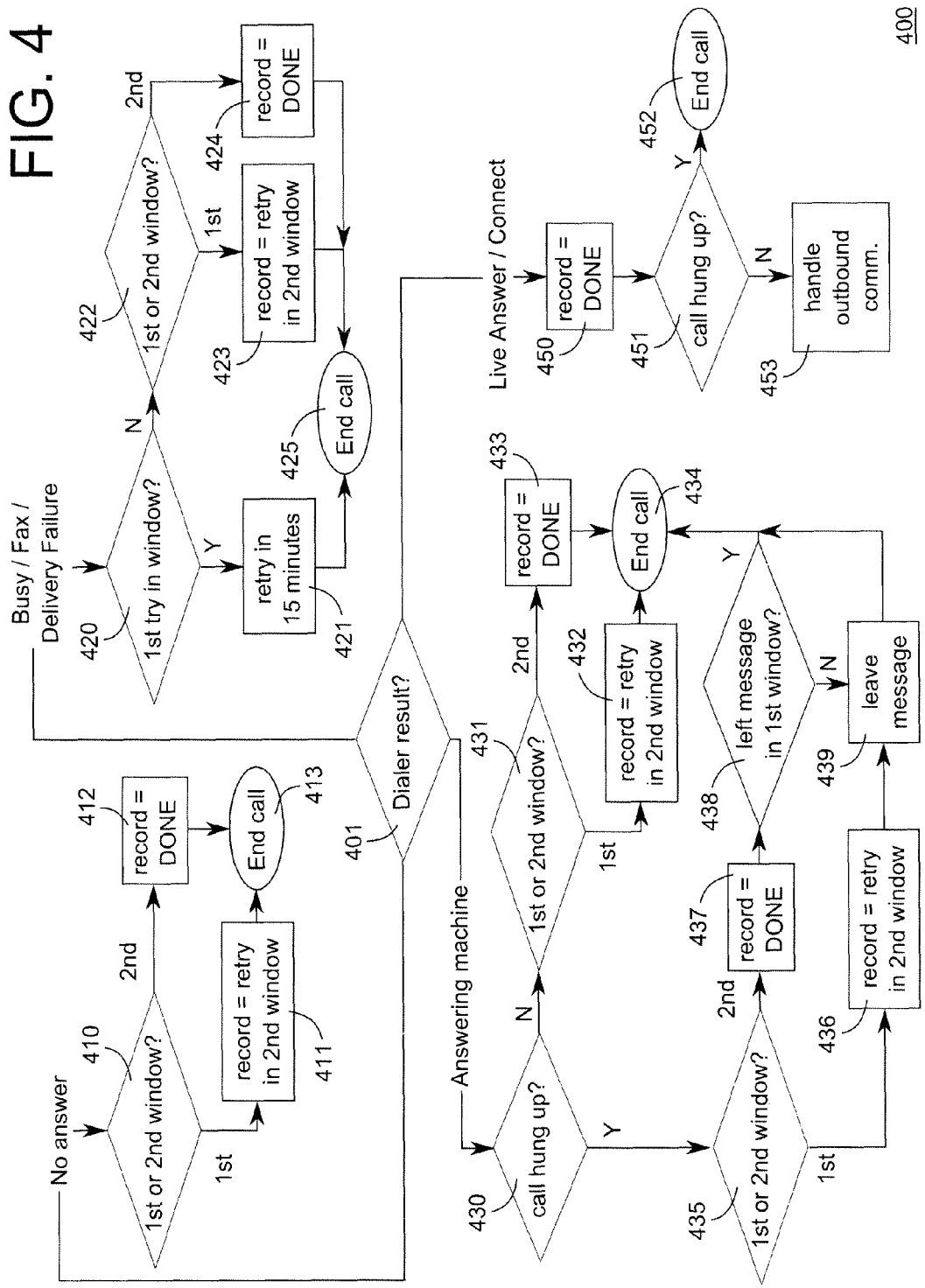
FIG. 4 illustrates a process 400 by which outbound calls are processed as part of step 370 illustrated in FIG. 3.

IVR server 132a includes a communication interface which allows for establishing multiple inbound and outbound communication sessions with voice network 110. In some embodiments, Voice Over IP (VOIP) is used to connect an IVR server 132a to a PSTN telephone network through a VOIP-to-PSTN gateway system. In some embodiments, IVR server 132a has a predetermined number of communication ports (not illustrated), each capable of conducting a single inbound or outbound communication session. In some embodiments, one or more ports may be dedicated for inbound communication sessions or dedicated for outbound communication sessions. In some embodiments, ports may be selectively configurable such that the ports are able to be used for either inbound or outbound communication sessions as desired. In some embodiments, some ports may be dedicated for inbound and/or outbound communication sessions while other ports may be selectively used for either inbound or outbound communication sessions. In some embodiments, the ports may be divided between a set dedicated for inbound communication sessions, a set which each can be selectively used for either inbound or outbound communication sessions, and a set dedicated for second line referral For each port, IVR server 132a is able to generate voice output for receipt by a communicant, and is also responsive to input, such as voice commands or Dual Tone Multi Frequency (DTMF) commands, received from a communicant. Under the control of software executing on IVR 132a, for example, this mechanism for outputting information and receiving input is used to interact with a communicant. As an example, IVR server 132*a* may be configured to process incoming communication sessions by providing a voice-operated menu, navigable by use of simple voice commands or touch-tone pad commands, for inbound caller 102 to submit and obtain various information, such as account balance information. IVR server 132*a* prompts the caller for certain information, collects other information (e.g., dialed number, caller ANI) obtained from voice network 110. Based on the collected and other information and services available to IVR server 132*a*, a customer may be able to perform automated self service activities solely by interacting with the IVR system. In other situations a customer may need to speak with a live agent in order to proceed. Also, as illustrated in FIGS. 3 and 4 of the present disclosure, IVR 132*a* may be configured to initiate outbound communication sessions with communicants such as outbound callee 101. The above mechanism for outputting information and receiving input is also useful for interacting with outbound callee 101. Additionally, IVR server 132*a* is responsive to, and/or can determine, communication session status information, such as when a communicant has terminated a communication session, as illustrated in part by steps shown in FIG. 4 of the present disclosure.

More than one IVR farm may be provided to, for example, provide geographic diversity in IVR farm locations to better ensure continuity of availability of IVR systems. IVR farm 130*b* is a separate farm configured in a similar manner to IVR farm 130*a* described above. In some embodiments, there may only be a single IVR farm, whereas in some other embodiments there may be more than the two IVR farms 130*a* and 103*b* illustrated in FIG. 1.

Figure 2:
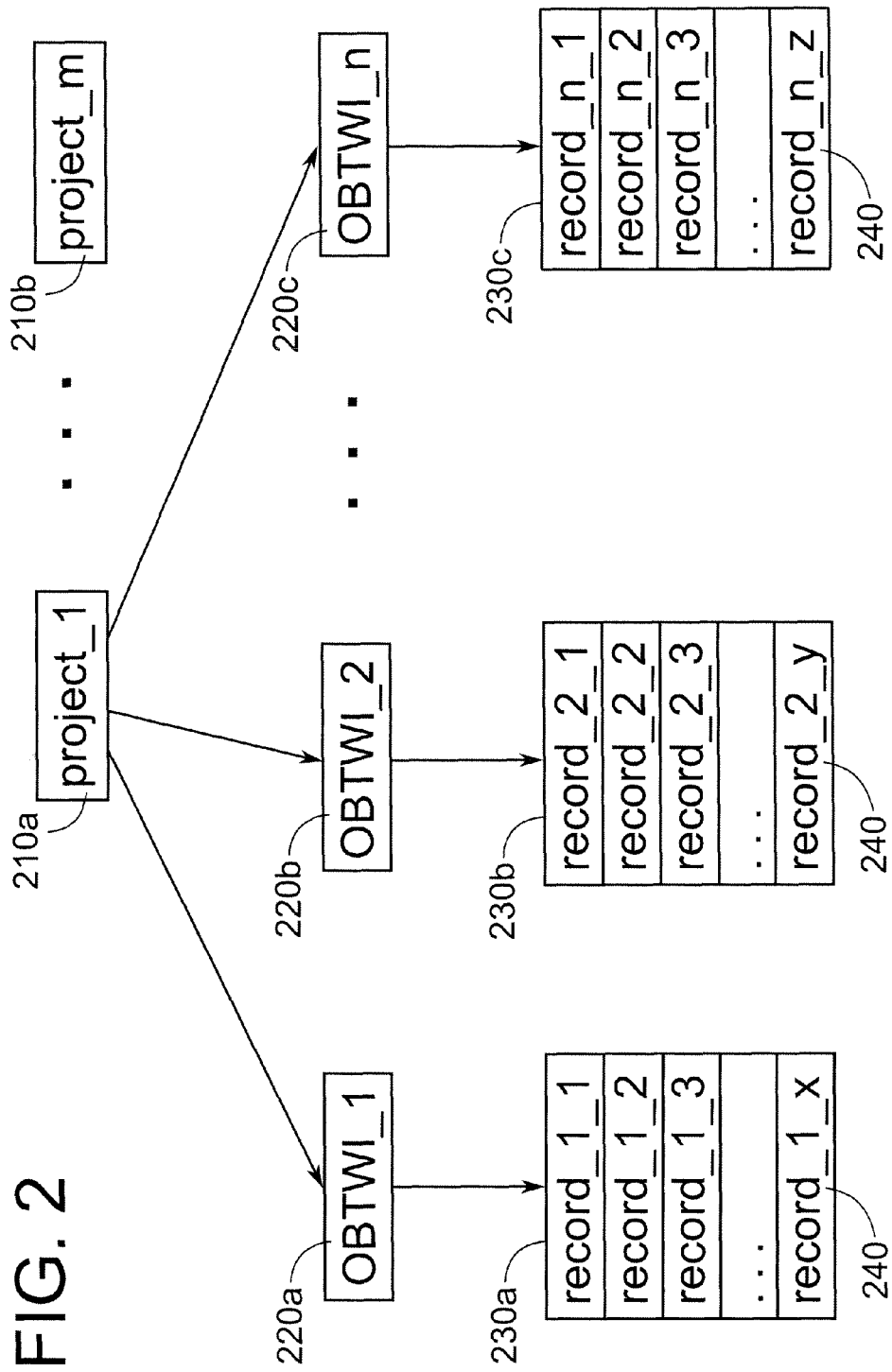
FIG. 2 illustrates records stored in call record server 150 for use by the disclosed techniques.

Driving table 150 is provided by, for example, a database system that maintains driving table records (as illustrated in FIG. 2, for example) in driving table 150 for use by the IVR servers. As discussed in more detail below, to establish outbound communication sessions, the IVR servers obtain driving table records from driving table 150, providing information, such as telephone numbers, used to initiate and establish outbound communication sessions. Driving table records contain additional information about their respective communicants, such as account information, or information relating to previous communications or attempts to communicate with the communicant. Further, as illustrated in FIG. 2, individual driving table records may be associated with various outbound projects involving outbound communications initiated by IVR servers, and the driving table records may be grouped within those outbound projects. An example of an outbound project is an after-call survey campaign, in which a subset of customers that have concluded customer support calls are contacted in order to perform a customer satisfaction survey. An outbound project may be entirely automated, in which only an IVR server interacts with a communicant, or live agents may be used, as discussed below. FIG. 1 illustrates an embodiment in which IVR servers 132*a* to 132*f* are connected via a network to driving table 150. In some embodiments, each IVR farm may have a separate driving table.

Front end system 160 provides a user interface for managing the operation of driving table 150 and IVR farms 130*a* and 103*b*. For example, front end system 160 may be used to add, modify, or delete driving table records in driving table 150. Additionally, front end system 160 may be used to assign driving table records to various outbound projects and groups of driving table records for outbound projects, such as the outbound time windows illustrated in FIG. 2. Also, front end system may be used to control which IVR servers, outbound projects, and OBTWIs are active, and at what times they are active. In some embodiments, such control may be effected, at least in part, by use of the cron job scheduling software and the rsh (remote shell) software, or the like, for performing scheduled remote control of the IVR servers. In some embodiments, each of the IVR servers may also be utilizing the cron software, with a crontab file remotely administered by front end system 160, in order to selectively enable and disable various outbound projects and OBTWIs, possibly on a per-IVR server basis.

Call center 140 coordinates the activities of a plurality of live agents, such as live agents 141*a* and 141*b* illustrated in FIG. 1. CVP system complex 120 may be configured, in some circumstances, to directly connect an inbound caller 102 to call center 140, or even a particular live agent 141*a* or 141*b* within the call center 140. In other circumstances, an IVR server, such as IVR server 132*a*, is used to establish a communication session with an inbound or outbound caller, and once having established the communication, transfers the communication to call center 140 for handling by live agent 141*a*. In some embodiments, one of a plurality of virtual ports, configured for "second line referral" mode, may be needed to perform the transfer, and may be unavailable until the communication session is terminated or returns to the IVR server (e.g., the call center transfers the call back). In some embodiments, multiple call centers may be provided. In some embodiments, cell centers are staffed to have particular outbound projects (e.g., one call center has live agents trained for project_1, whereas a different call center has call agents trained for project_m). For example, it may be easier to staff live agents during all of the desired hours of operation by utilizing call centers located in various time zones. In some embodiments, live agents 141*a* and 141*b* may be physically collocated. In some embodiments, live agents 141*a* and 141*b* may each be operating for different locations, such as their homes, with call center 140 coordinating their activities.

FIG. 2 illustrates records stored in driving table 150 for use in conjunction with the disclosed subject matter. For outbound projects, involving establishing outbound communications, each communicant to be contacted via the outbound program has a corresponding driving table record 240. Driving table record 240 includes information, such as a telephone number, used to attempt to establish a communication session with its corresponding communicant. Driving table record 240 may include additional information regarding the communicant, such as account information or information regarding previous communications or attempts to communicate with the communicant.

As illustrated in FIG. 2, driving table 150 may maintain driving table records 240 for a plurality of outbound projects, including outbound project project_1 (210*a*) and outbound project project_m (210*b*). In some embodiments, there may only be a single outbound project for which driving table 150 is used, in which case there may be no need to record associations between outbound projects and driving table records 240. Individual driving table records 240 may be associated with zero, one, or more outbound projects, and may include information which specifically used for one outbound project, but not other outbound projects.

As illustrated in FIG. 2, for outbound project project_1 (210*a*), each driving table record 240 is associated with one outbound time window indicator (OBWTI) of a plurality of OBTWIs including OBTWI_1 (220*a*), OBTWI_2 (220*b*), and OBTWI_n (220*c*). For example, within the group 230*a* of driving table records 240 associated with OBTWI_1 (220*a*), there is included driving table records 240 record_1_1, record_1_2, record_1_3, and record_1_x. Different driving table records 240 are included in groups 230*b*, and 230*c*, which each may also have various numbers of driving table records 240 associated therewith.

Each OBTWI corresponds to one or more time windows during which attempts at establishing outbound communication sessions to communicants associated with the OBTWI are permitted. Not all of the OBTWIs for a outbound project are necessarily active at the same time; for example, an OBTWI corresponding to an eastern time zone is likely to become active in the morning before one in a western time zone. In some embodiments, each OBWTI corresponds to a time zone, and is used to ensure that attempts at outbound communication are made at times appropriate to the local time (i.e., the time within the corresponding time zone) for the communicant specified by a driving table record 240. In some embodiments, OBTWIs may be designated which correspond to smaller geographic regions (e.g., particular states or regions with particular restrictions on times during which commercial telephone calls may be placed), or other factors (e.g., known unavailability for particular driving table records 240 on certain days of the week). Additionally, a range of time associated with a time window may also be determined by local time for call center 140. For example, although it may be acceptable to contact communicants in California (in the Pacific time zone) until 8 PM, it may only be desirable to staff live agents at an East Coast office until 8 PM in the Eastern time zone, which translates to only 5 PM in the Pacific time zone. Tables 1 and 2 illustrate a set of five OBTWIs defined for a outbound project, for which corresponding time windows are determined based on (1) appropriate communication times according to local time, (2) hours of operation for call center 140, and (3) the day of the week (e.g., on Saturdays, different ranges of time are deemed appropriate for establishing outbound communications.

TABLE 1

Monday - Friday Time Windows

| Time Window | Label | First Window (formal time) | Second Window (formal time) |
| --- | --- | --- | --- |
| EST | obESTACS | 800 - 1400 local (800 - 1400 EST) | 1500 - 2000 local (1500 - 2000 EST) |
| CST | obCSTACS | 800 - 1400 local (900 - 1500 EST) | 1500 - 1900 local (1600 - 2000 EST) |
| MST | obMSTACS | 800 - 1400 local (1000 - 1600 EST) | 1500 - 1800 local (1700 - 2000 EST) |
| PST | obPSTACS | 800 - 1400 local (1100 - 1700 EST) | 1500 - 1700 local (1800 - 2000 EST) |
| HST | obHSTACS | 800 - 1400 local (1300 - 1900 EST) | 1430 - 1500 local (1930 - 2000 EST) |

TABLE 2

Saturday Time Windows

| Time Window | Label | First Window (formal time) | Second Window (formal time) |
| --- | --- | --- | --- |
| EST | obESTACS | 800 - 1300 local (800 - 1300 EST) | 1400 - 1800 local (1400 - 1800 EST) |
| CST | obCSTACS | 800 - 1300 local (900 - 1400 EST) | 1400 - 1700 local (1500 - 1800 EST) |
| MST | obMSTACS | 800 - 1300 local (1000 - 1500 EST) | 1400 - 1600 local (1600 - 1800 EST) |
| PST | obPSTACS | 800 - 1300 local (1100 - 1600 EST) | 1400 - 1500 local (1700 - 1800 EST) |
| HST | obHSTACS | 800 - 1200 local (1300 - 1700 EST) | 1230 - 1300 local (1730 - 1800 EST) |

To generate Tables 1 and 2, several factors were taken into consideration. First, reasonable ranges of time for establishing outbound communications were determined to be 800-1400 and 1500-2000 local time on Monday through Friday, and 800-1300 and 1400-1800 local time on Saturday. Because two ranges are time are specified for each day, each OBTWI has two time windows for each day. Second, call center 140 operates within the Eastern time zone (EST), and is staffed from 800-2000 EST on Monday through Friday, and from 800-1800 EST on Saturday. Due to these factors, from 800-1100 EST call center 140 is staffed, but no outbound communications are made to driving table records in the PST OBTWI, and from 1500-1800 PST no outbound communications are made to driving table records in the PST OBTWI, even though calls are reasonable during this time. For an outbound project in which live agents are not utilized, it is not necessary to take into account when a cell center is staffed for the outbound project.

Although the above example illustrates OBTWIs each having two time windows (labeled "First Window" and "Second Window," respectively). As noted above an OBTWI may have one or more associated time windows. For example, an OBTWI may have three time windows, such as 900-1300, 1400-1700, and 1800-2045. Additionally, the OBTWIs associated with a project may have varying numbers of associated time windows. For example, a project might have a first OBTWI with one time window, a second OBTWI with two time windows, and a third OBTWI with three windows.

In some embodiments, rather than generating and maintaining groups of driving table records 240 such as group 230a illustrated in FIG. 2, a driving table record 240 associated with a particular OBTWI within a particular outbound project may be dynamically retrieved from driving table 150.

In some embodiments, a driving table record 240 is automatically associated with an OBTWI based on information included in the driving table record 240 that is associated with a geographical location, such as a telephone area code or a mailing or home address. In such automatic processing, certain filtering criteria may also be applied to exclude driving table records from processing. Examples of such filtering criteria include, but are not limited to, where a time zone for a telephone number being called cannot be identified, where a telephone number is outside of the country, where a duplicate contact is detected (i.e., the same telephone number and account number have been duplicated in the same day), and an unsupported number type is detected (e.g., an 800 toll-free number or 900 area code number). Filtered driving table records may be flagged for later review and/or manual processing.

As illustrated in Tables 1 and 2 above, in some embodiments each OBTWI may have an associated text label. In some embodiments, the text label may be descriptive of its associated OBTWI. For example, the label "obESTACS" provides three pieces of information about its associated OBTWI: (1) "ob" indicates it is for an output project, (2) "EST" indicates it is for the EST time zone, and (3) "ACS" indicates the project, such as an "After Call Survey" or "ACS" project. Further, this textual label may be used to more conveniently identify each OBTWI, such as for software tools provided by front end system 160. For example, a text label might be used as a command line parameter to identify an OBTWI to a program. For example, a command "set_obtwi obESTACS=N" could be used to command that the OBTWI associated with the label "obESTACS" be turned off, a command "set_obtwi obESTACS=H" could be used to command that a first time window of the OBTWI associated with the label "obESTACS" be enabled, and a command "set_obtwi obESTACS=h" could be used to command that a second time window of the OBTWI associated with the label "obESTACS" be enabled.

In some embodiments, the time windows generated for each of the OBTWIs across each of the outbound projects may be used to generate control files, such as crontab files, for use by the IVR servers or front end system 160.

FIG. 3 illustrates a process 300 by which outbound calls are processed. In this example, each OBTWI includes first and second time windows, much as illustrated in Tables 1 and 2 above. Also, in this example, each IVR server 132 makes use of a plurality of virtual ports, each providing a communication channel, for establishing communication sessions, which many be selectively configured to handle inbound or outbound communication sessions. Process 300 illustrates a call handling process used for one of the virtual ports included in IVR server 132a, and this process is used for other virtual ports included in IVR 132a. In some embodiments, some virtual ports may be configured to only handle inbound communication sessions, and not make use of the full process illustrated in FIG. 3.

In step 305, IVR 132a prepares the virtual port for receiving an inbound communication. In some embodiments, as part of step 305 IVR 132a instructs peripheral gateway 131a and/or CVP system complex 120 to route a new inbound communication such that it will be handled by the virtual port. At step 310, IVR 132a waits a predetermined period of time after completing step 305 for a new inbound communication to arrive at the virtual port. In some embodiments, this period of time may vary from one virtual port to another. This better ensures that across multiple virtual ports, for each of which process 300 is being performed, later steps of process 300 that access driving table 150 do not seek to access driving table 150 simultaneously, in order to obtain a low, spread-out load versus a high instantaneous load for a system providing driving table 150. Particularly on a first pass through process 300, if a single constant value were used for the time period across all virtual ports, there would be accesses of driving table 150 corresponding to each of the virtual ports at the same time when the time period expired, which could impose a significant load on a system providing driving table 150. In some embodiments, a base period of time (e.g., 30 seconds) is specified in a configuration file, and a virtual port-specific additional time is added. For example, the additional time may be a random value, or a modulo of a number assigned to each virtual port (e.g., a number of seconds corresponding to port_number modulo 6). In some embodiments, only on the first pass through process 300 is the varied period of time used for the virtual ports. If an inbound communication is received on the virtual port within the time period, at step 315 IVR 132a handles the inbound communication session. For example, IVR 132a may provide an interactive voice-controlled menu that, in some circumstances, will transfer the communication session to call center 140. After step 315, process 300 returns to step 305. In some embodiments, step 315 may be determined to have completed when an inbound communication session is transferred to call center 140. In some embodiments, step 315 may be determined to have completed after an inbound communication session transferred to call center 140 has been terminated.

Process 300 advances to step 320 if an inbound communication is not received within the time period. At step 320, IVR 132a selects an outbound project, from the outbound projects project_1 (210a) through project_m (210b), for which an outbound communication is to be attempted. In some embodiments, this selection may be based on weightings assigned to the outbound projects. For example, the weightings may be set for 75% of outbound communications to be for driving table records associated with project_1, and the remaining 25% for driving table records associated with project_m (assuming only these two outbound projects are used). In some embodiments, these weightings may be automatically determined based on the number of driving table records associated with each outbound project (e.g., proportional to the respective numbers of driving table records). In some embodiments, the weightings will be observed at the level of IVR server 132a, IVR farm 130a (e.g., although there may be a 25% rate for the IVR servers 132a to 132c in the aggregate, individual IVR servers may observe different rates), or across all of the IVR farms. In some embodiments, the weightings may be modified using front end system 160. Under some circumstances, there may not be a currently active outbound project available, in which case process 300 returns to step 305 (not illustrated).

In step 325, IVR 132a verifies that the virtual port is usable for outbound communication sessions. In some circumstances, IVR server 132a may be configured to only use the particular virtual port for incoming communications or for second line referral (used, for example, to transfer a communication session from IVR server 132a to call center 140). One example is where, via controls provided by front end system 160, one or more IVR servers are reconfigured to designate an increased number of virtual ports as only for incoming communications in order to handle an anticipated or ongoing increase in incoming traffic. In some embodiments or situations, virtual ports can also be configured only for use for outgoing communication, consequently skipping or truncating steps 305, 310, and/or 330, in order to more rapidly communicate information to customers, such as during a catastrophe. If the verification of step 325 fails, process 300 returns to step 305. Otherwise, process 300 continues to step 330.

In step 330, IVR server 132a verifies that the ports are not too busy to place a new outbound call. In some embodiments, a minimum number of virtual ports, whether on IVR server 132a, across all of the IVR servers in IVR farm 130a, or across all IVR farms, are to be left unused for new inbound communications in order to ensure that incoming communications are received and handled, to satisfy customer service expectations. In some embodiments, IVR server 132a checks if the percentage of all ports on IVR system 132a engaged in inbound communication sessions is below a predetermined threshold. If the system is too busy, and the virtual port needs to be used for processing incoming calls, process 300 returns to step 305. Otherwise, process 300 continues to step 335.

At step 335, IVR server 132a selects an OBTWI from the presently active OBTWIs associated with the outbound project selected in step 320. For example, if outbound project project_1 (210a) were selected in step 320, IVR server 132a would select one of the plurality of OBTWIs for project_1, the plurality of OBTWIs including OBTWI_1 (220a), OBTWI_2 (220b), and OBTWI_n (220c) (assuming each OBTWI is active at the time). In some embodiments, this selection may be based on weightings assigned to the OBTWIs for an outbound project. For example, the weightings may be set for 75% of outbound communications made for outbound project project_1 to be for driving table records associated with OBTWI_1, 15% for driving table records associated with OBTWI_2, and 10% for OBTWI_n. In some embodiments, these weightings may be automatically determined based on the number of driving table records associated with each OBTWI (e.g., proportional to the numbers of driving table records). In some embodiments, the weightings will be observed at the level of IVR server 132a, IVR farm 130a (e.g., although there may be a 15% rate for the IVR servers 132a to 132c in the aggregate, individual IVR servers may observe different rates), or across all of the IVR farms. In some embodiments, the weightings may be modified using front end system 160. Under some circumstances, there may not be a currently active OBTWI available, in which case process 300 returns to step 305 (not illustrated). For example, in the middle of the night, there may be no appropriate records to call.

At step 340, IVR server 132*a* disables new inbound communication sessions for the virtual port. In some embodiments, as part of step 340 IVR 132*a* instructs peripheral gateway 131*a* and/or CVP system complex 120 not to route new inbound communications to be handled by the virtual port. In some embodiments, as part of step 340 IVR 132*a* instructs peripheral gateway 131*a* to reset the virtual port. At step 345, IVR 132*a* prepares the virtual port to attempt to establish an outbound communication. In some embodiments, as part of step 345 IVR 132*a* instructs CVP system complex 120 to configure a communication port, channel, or line for outbound communication. In some embodiments, as part of step 345 IVR 132*a* notifies peripheral gateway 131*a* that the virtual port is available, then issues an indication to peripheral gateway 131*a* that IVR 132*a* is handling an inbound communication on the virtual port (in order to block arrival of a new inbound communication), and then initiates an outbound communication session on the virtual port.

At step 350, IVR 132*a* verifies that there are not too many active calls for the outbound project. In some embodiments, where there are live agents assigned to the selected outbound project, this may be determined using an estimate calculated based on a number of live agents assigned to the selected outbound project that are expected to be available (based on, for example, the total number of agents, the number of live agents currently available, and an average amount of time the agents take to handle each communication session), a number of pending outgoing communications, and a proportion of the pending outgoing communications expected to be directed to call center 140 (based on, for example, an observed proportion). Ideally, if an outbound communication is established with a live communicant and transferred to call center 140, the communicant will immediately, or in a short period of time, begin speaking with a live agent. However, it is desirable not to be too conservative in determining a threshold, as although reducing the number of attempted outbound communications may better ensure a communicant will more quickly speak with a live agent, it may also result in a significant number of live agents being idle due to oversupply. Improving the result of step 350 may be accomplished by adjusting expectations of live agent performance (e.g., time to handle each communication session) and the proportion of the pending outgoing communications expected to be directed to call center 140 based on actual observations. If step 350 determines there are too many active calls for the outbound project, process 305 returns to step 305. In some embodiments, step 350 may be omitted or skipped where, for example, it is expected that none or few of the outgoing communication sessions for the selected outbound project will require use of a live agent.

At step 355, IVR server 132*a* obtains a driving table record for the selected OBTWI from driving table 160. For example, if OBTWI OBTWI_1 (220*a*) is selected, one of the driving table records 240 from group or driving table 230*a* is obtained. In some embodiments, prioritization of the driving table records may be performed. For example, if the current time is during a second call window defined for an OBTWI, driving table records which failed in the first window may be prioritized over driving table records which have not yet been attempted, in order to fully complete their handling. As another example, where a driving table record is scheduled to be retried in a short period of time (see, for example, step 421 illustrated in FIG. 4), it may be placed ahead of other driving table records once the retry period has expired.

At step 360, IVR server 132*a* sets up parameters for establishing the outbound communication session for the obtained driving table record. In some embodiments, this includes obtaining a communication address, such as a telephone number, from the driving table record for establishing the communication session. In one example, one of a plurality of communication addresses recorded in driving table record 240 is selected based on whether a communicant is currently an active customer for a mobile communication network. In this example, where the communicant is an active customer, an address for a mobile communication device is used, and where the communicant is an inactive customer, an address such as a home telephone number is used. In some embodiments, where outbound callee 101 is provided with a communication address for a party initiating a communication session, such as via caller ID, an appropriate address is set according to the outbound project selected in step 320.

At step 365, the outbound communication session is initiated. In some embodiments, such as where voice network 110 is a PSTN network, an automated dialer is invoked to place an outbound telephone call. In some embodiments, hardware and software components included in IVR server 132*a* may be configured to initiate the outbound communication session.

At step 370, a result for the attempted outbound communication is determined. An example of processing performed for step 370 is illustrated in FIG. 4, and discussed below. Where an outbound communication session is established, process 300 advances to step 375, in which IVR server 132*a* interacts with outbound callee 101 in order to obtain information and/or ensure there is a live communicant. In some embodiments or circumstances, the outbound communication session is transferred to call center 140 for handling by a live agent. If an outbound communication session is not established in step 370, process 300 returns to step 305. However, as illustrated in FIG. 4 and discussed below, circumstances of the failure to establish the outbound communication session may affect later processing of the driving table record.

In some embodiments, steps 320, 335, and 355 may be performed by call record server 150 in response to a request for a next driving table record from an IVR server, simplifying driving table record handling in the IVR servers.

FIG. 4 illustrates a process 400 by which outbound calls are processed as part of step 370 illustrated in FIG. 3, for an exemplary embodiment in which a call is placed via a PSTN network and each OBTWI has two corresponding time windows (as illustrated by Tables 1 and 2, above). Those skilled in the art would understand how the techniques illustrated in FIG. 4 may be adapted where voice network 110 utilizes other technologies. Process 400 begins with step 401, in which a dialer result is obtained. Based on the dialer result (no answer, busy/fax/delivery failure, answering machine, or live answer/connect), one of steps 410, 420, 430, and 450 is selected.

Where the dialer result is "no answer," indicating failure to establish an outgoing communication session without any response from outbound callee 101, at step 410 it is determined whether the attempted session was made during the first or second time window. If the attempt was made in the first window, at step 411 driving table record 240 is updated to indicate that driving table record 240 should be retried in the second time window. Otherwise (i.e., the attempt was made in the second call window), at step 412 driving table record 240 is updated to indicate handling of driving table record 240 is complete. At step 413, process 300 continues at step 370.

Where the dialer result is "busy" (indicating the communication session could not be established because outbound callee 101 is already engaged in another communication session), "fax" (indicating the dialer detected a fax machine responded to the attempted communication), or "delivery failure" (indicating a low-level failure occurred), at step 420 it is determined if the attempt is the first try made in the time window. If so, the driving table record is scheduled to be retried in 15 minutes, or some other predetermined period of time, and via step 425, process 370 continues at step 370. If step 420 determines the attempt was not the first try in the time window, at step 422 it is determined whether the attempted communication session was made in the first or second time window for the OBTWI. If the attempt was made in the first window, at step 423 driving table record 240 is updated to indicate that driving table record 240 should be retried in the second time window. Otherwise (i.e., the attempt was made in the second call window), at step 424 driving table record 240 is updated to indicate handling of driving table record 240 is complete. At step 425, process 300 continues at step 370.

Where the dialer result is "answering machine," indicating the dialer determined an answering machine responded to the attempted communication session, at step 430 it is determined whether the communication session has been terminated (e.g., if the detected answering machine has "hung up" on the call). If the communication session was terminated, at step 431 it is determined whether the attempted communication session was made in the first or second time window for the OBTWI. If the attempt was made in the first window, at step 432 driving table record 240 is updated to indicate that driving table record 240 should be retried in the second time window. Otherwise (i.e., the attempt was made in the second call window), at step 433 driving table record 240 is updated to indicate handling of driving table record 240 is complete. If at step 430 it is determined the communication session has not been terminated, at step 435 it is determined whether the attempted communication session was made in the first or second time window for the OBTWI. If the attempt was made in the first window, at step 436 driving table record 240 is updated to indicate that driving table record 240 should be retried in the second time window, and at step 439 IVR server 132a leaves a message on the answering machine providing outbound callee 101 with information, including contact information. Otherwise (i.e., step 435 determines that the attempt was made in the second call window), at step 437 driving table record 240 is updated to indicate handling of driving table record 240 is complete, and process 400 advances to step 438. At step 438, based on information recorded in driving table record 240, it is determined whether a message was left during an attempt during the first time window. If step 438 determines no message was left, at step 439 IVR server 132a leaves a message on the answering machine providing outbound callee 101 with information, including contact information. If step 438 determines a message was left, process 400 advances to step 434. At step 434, process 300 continues at step 370.

Where the dialer result is "live answer" (indicating that the dialer determined a live communicant responded to the attempted communication) or "connect" (simply indicating a communication session has been established), at step 450 driving table record 240 is updated to indicate handling of driving table record 240 is complete. At step 451, it is determined whether the communication session has been terminated (e.g., if outbound callee 101 "hung up" on the call). If the communication session was terminated, process 400 continues at step 452, and process 300 continues at step 370. If step 451 determines the communication session has not been terminated, at step 453 process 300 continues at step 375, in which IVR server 132a engages in interactive communication with outbound callee 101, and may transfer the communication session to call center 140.

Additionally, the behavior for process 400 may be modified to respond to whether driving table record 240 is for an active or an inactive account. Tables 3 and 4 below illustrate differences in behavior that may be performed between inactive and active accounts. For example, for an active account, no subsequent retries are made once a fax machine is detected by the dialer.

TABLE 3

Actions Taken for Inactive Accounts

| Dialer Result | Next Action | | | |
|---|---|---|---|---|
| | 1st Window, 1st Attempt | 1st Window, 2nd Attempt | 2nd Window, 1st Attempt | 2nd Window, 2nd Attempt |
| Answering Machine | Leave message; Retry in 2nd window | Retry in 2nd window | Leave message if none left in 1st window; No retry | No retry |
| Busy | Retry in 15 min | Retry in 2nd window | Retry in 15 min | No retry |
| Delivery Failure | Retry in 15 min | Retry in 2nd window | Retry in 15 min | No retry |
| Fax Tone | Retry in 15 min | Retry in 2nd window | Retry in 15 min | No retry |
| No Answer | Retry in 2nd window | Retry in 2nd window | No retry | No retry |
| Live Answer | Do not recall | Do not recall | Do not recall | Do not recall |

TABLE 4

Actions Taken for Active Accounts

| Dialer Result | Next Action | | | |
|---|---|---|---|---|
| | 1st Window, 1st Attempt | 1st Window, 2nd Attempt | 2nd Window, 1st Attempt | 2nd Window, 2nd Attempt |
| Answering Machine | Leave message; Retry in 2nd window | Retry in 2nd window | Leave message if none left in 1st window; No retry | No retry |
| Busy | Retry in 15 min | Retry in 2nd window | Retry in 15 min | No retry |
| Delivery Failure | Retry in 15 min | Retry in 2nd window | Retry in 15 min | No retry |
| Fax Tone | Do not recall | Do not recall | Do not recall | Do not recall |
| No Answer | Retry in 2nd window | Retry in 2nd window | No retry | No retry |
| Live Answer | Do not recall | Do not recall | Do not recall | Do not recall |

As shown by the above discussion, functions relating to the IVR-related techniques may be implemented on computers connected for data communication via the components of a packet data network. Although special purpose devices may be used, such devices also may be implemented using one or more hardware platforms intended to represent a general class of data processing device commonly used to run "server" programming so as to implement the IVR-related techniques discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the IVR-related techniques. The software code is executable by the general-purpose computer that performs the IVR-related techniques. In operation, the code is stored within the general-purpose computer platform. At other times, however, the software may be stored at other locations and/or transported for loading into the appropriate general-purpose computer system. Execution of such code by a processor of the computer platform enables the platform to implement the IVR-related techniques, in essentially the manner performed in the implementations discussed and illustrated herein.

Figure 6:
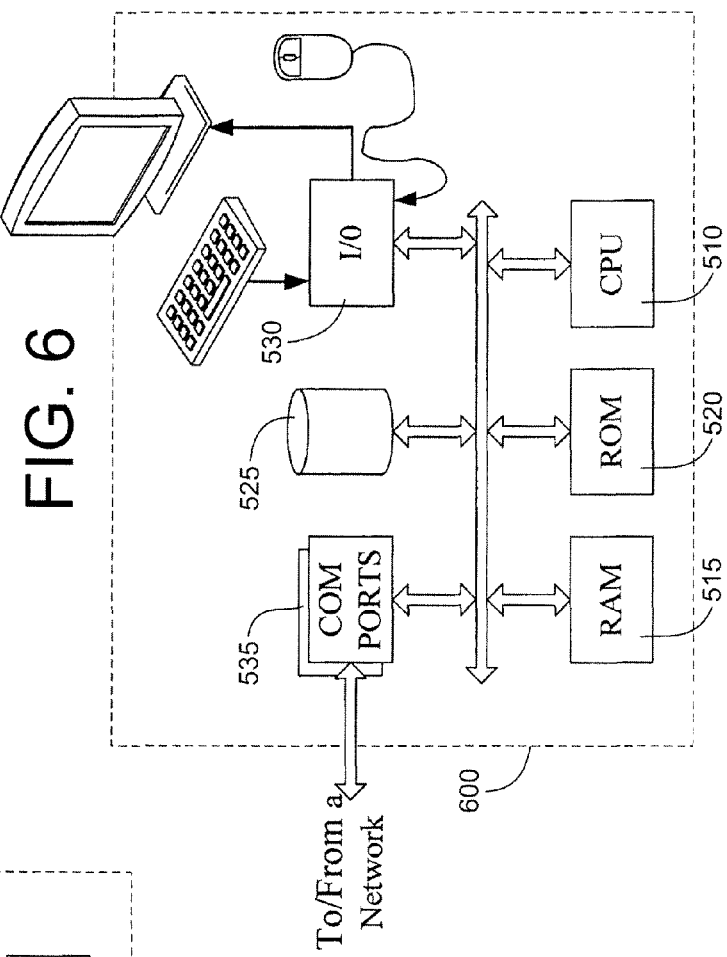
FIG. 6 illustrates a functional block diagram of a general purpose computer platform 600.
Figure 5:
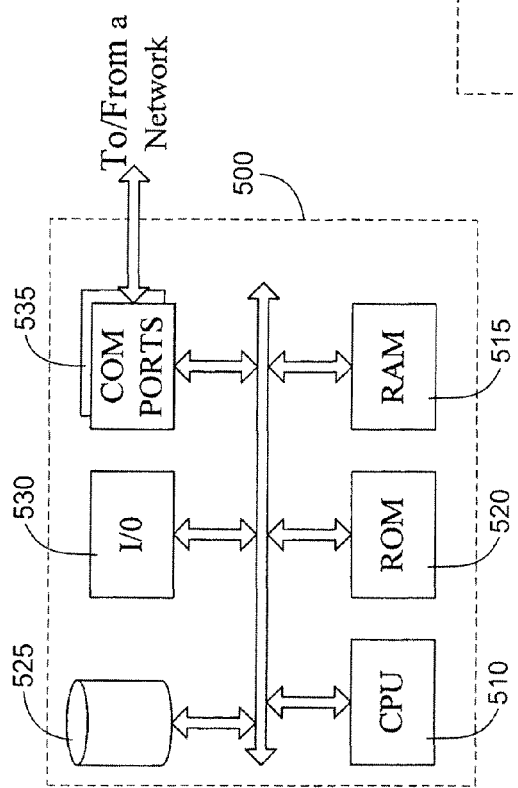
FIG. 5 illustrates a functional block diagram of a general purpose computer platform 500.

FIGS. 5 and 6 provide functional block diagram illustrations of general purpose computer hardware platforms. FIG. 5 illustrates a network or host computer platform 500, as may typically be used to implement a server. FIG. 6 depicts a computer 600 with user interface elements, as may be used to implement a personal computer or other type of work station or terminal device, although computer 500 may also act as a server if appropriately programmed. It is believed that those skilled in the art are familiar with the structure, programming and general operation of such computer equipment and as a result the drawings should be self-explanatory.

Computers 500 and 600 each include a bus 505, processing unit(s) 510, a system memory (RAM) 515, a read-only memory (ROM) 520, a permanent storage device 525, an input/output (I/O) device interface 530, and a communication interface 535.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off Some implementations of the invention use a mass-storage device (such as a magnetic or optical disk and its corresponding disk drive) as the permanent storage device 525.

Other implementations use a removable storage device (such as a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the invention's processes are stored in the system memory 515, the permanent storage device 525, and/or the read-only memory 520.

For example, the various memory units include instructions for processing multimedia items in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, such as cathode ray tubes (CRT) or liquid crystal displays (LCD). Some implementations include devices such as a touchscreen that functions as both input and output devices.

Finally, as shown in FIG. 5, bus 505 also couples electronic system 500 to a network (not shown) through a communication interface 535. In this manner, the computer can be a part of a network of computers (such as a local area network ("LAN"), a wide area network ("WAN"), or an Intranet, or a network of networks, such as the Internet. Any or all components of electronic system 400 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques outlined in this disclosure may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for automated communication comprising:
    configuring, by a server, a communication port for receiving an inbound communication;
    determining whether the inbound communication is received within a predetermined time period;
    upon determining that the inbound communication is not received within the predetermined time period on the communication port:
        from among outbound communication groups of call records, each respective group of call records having associated therewith respective ranges of time that are valid for initiating an outbound communication session for a group of communicants identified in the call records of the respective outbound communication group, identifying, by the server, a plurality of the outbound communication groups of call records, each of the plurality of identified outbound communication groups of call records having a first respective range of time encompassing a current time local to the group of communicants;
        selecting, by the server, from among the plurality of identified outbound communication groups, an outbound communication group of call records corresponding to a particular region having restrictions on times during which commercial telephone calls may be placed, wherein the selection is based on the current time local to the group of communicants being a time that is not restricted by the region;
        obtaining a call record from among the call records associated with the selected outbound communication group of call records;
        disabling the communication port for any further inbound communication; and
        initiating, by the server, an outbound communication session to a communication address included in the obtained call record on the communication port.

2. The method of claim 1, further comprising:
    determining that the outbound communication session has been established with a live communicant; and
    transferring the outbound communication session to a live agent for communication with the communicant associated with the obtained call record.

3. The method of claim 1, wherein
the method further comprises:
    detecting that the outbound communication session failed after initiation; and
    after detecting failure of the outbound communication session, initiating a second outbound communication session to the communication address included in the obtained call record at a later time within another range of time associated with the selected outbound communication group.

4. The method of claim 3, wherein
during the other range of time, the obtaining one of the call records prioritizes call records for which a failure of an outbound communication session was detected during the first range of time.

5. The method of claim 1, wherein
each of the call records is associated with a respective one of the outbound communication groups of call records, based upon a telephone area code or a street address included in the call record.

6. The method of claim 1, wherein
the ranges of time associated with each group of call records corresponds to a time zone, and
at least one of the ranges of time associated with one of the groups of call records correspond to a different time zone than at least one of the ranges of time associated with another of the groups of call records.

7. The method of claim 1, wherein
one of the groups of call records corresponds to a particular state, and
at least one of the ranges of time associated with one of the groups of call records correspond to a different state than at least one of the ranges of time associated with another of the groups of call records.

8. The method of claim 1, wherein
at least one of the ranges of time associated with one of the groups of call records correspond to a different region placing different restrictions on times during which commercial telephone calls may be placed.

9. The method of claim 8, wherein
at least one of the ranges of time associated with one of the groups of call records is additionally determined by a first time local to the region and a second time local to an associated call center, the first and second times being different.

10. The method of claim 9, wherein
at least one of the ranges of time associated with one of the time window groups of call records is additionally determined by a day of the week.

11. The method of claim 1, wherein
selecting the outbound communication group of call records is further based on weightings associated with each of the plurality of outbound communication groups.

12. The method of claim 1, further comprising:
selecting a project from a plurality of projects, each project having an associated plurality of outbound communication groups, wherein
the plurality of outbound communication groups is the plurality of outbound communication groups associated with the selected project.

13. A system for automated communication, the system comprising:
    one or more processors; and
    a machine-readable medium comprising instructions stored therein, which when executed by the processors, cause the processors to:
    configure a communication port to receive an inbound communication;
    determine whether the inbound communication is received within a predetermined time period;
    upon determination that the inbound communication is not received within the predetermined time period on the communication port:

from among outbound communication groups of call records, each respective group of call records having associated therewith respective ranges of time that are valid for initiating an outbound communication session for a group of communicants identified in the call records of the respective outbound communication group, identify a plurality of the outbound communication groups of call records, each of the plurality of outbound communication groups of call records having a first respective range of time encompassing a current time local to the group of communicants;

select, from among the plurality of outbound communication groups, an outbound communication group of call records corresponding to a particular region having restrictions on times during which commercial telephone calls may be placed, the selection based on the current time local to the group of communicants being a time that is not restricted by the region;

obtain a call record from among the call records associated with the selected outbound communication group of call records;

disable the communication port for any further inbound communication; and initiate an outbound communication session to a communication address included in the obtained call record on the communication port.

14. The system of claim 13, the instructions causing the processors to perform operations further comprising:
determining that the outbound communication session has been established with a live communicant; and
transferring the outbound communication session to a live agent for communication with the communicant associated with the obtained call record.

15. The system of claim 13, wherein
the operations further comprise:
detecting that the outbound communication session failed after initiation; and
after detecting failure of the outbound communication session, initiating a second outbound communication session to the communication address included in the obtained call record at a later time within another range of time associated with the selected outbound communication group.

16. The system of claim 15, wherein
during the other range of time, the obtaining one of the call records prioritizes call records for which a failure of an outbound communication session was detected during the first range of time.

17. The system of claim 13, wherein
each of the call records is associated with a respective one of the of outbound communication groups of call records based upon a telephone area code or a street address included in the call record.

18. The system of claim 13, wherein
selecting the outbound communication group of call records is further based on weightings associated with each of the plurality of outbound communication groups.

19. The system of claim 13, the instructions causing the processors to perform operations further comprising:
selecting a project from a plurality of projects, each project having an associated plurality of outbound communication groups, wherein
the plurality of outbound communication groups is the plurality of outbound communication groups associated with the selected project.

20. A non-transitory machine-readable medium comprising instructions stored therein, which when executed by a machine, cause the machine to:
configure a communication port to receive any inbound communication;
determine whether an inbound communication is received within a predetermined time period;
upon determination that no inbound communication is received within the predetermined time period on the communication port:
from among outbound communication groups of call records, each respective group of call records having associated therewith respective ranges of time that are valid for initiating an outbound communication session for a group of communicants identified in the call records of the respective outbound communication group, identify a plurality of the outbound communication groups of call records, each of the plurality of outbound communication groups of call records having a first respective range of time encompassing a current time local to the group of communicants;
select, from among the plurality of outbound communication groups, an outbound communication group of call records corresponding to a particular region having restrictions on times during which commercial telephone calls may be placed, the selection based on the current time local to the group of communicants being a time that is not restricted by the region;
obtain a call record from among the call records associated with the selected outbound communication group of call records;
disable the communication port for any inbound communication; and
initiate an outbound communication session to a communication address included in the obtained call record on the communication port.

21. The machine-readable medium of claim 20, the instructions causing the machine to perform operations further comprising:
determining that the outbound communication session has been established with a live communicant; and
transferring the outbound communication session to a live agent for communication with the communicant associated with the obtained call record.

22. The machine-readable medium of claim 20, wherein
the operations further comprise:
detecting that the outbound communication session failed after initiation; and
after detecting failure of the outbound communication session, initiating a second outbound communication session to the communication address included in the obtained call record at a later time within another range of time associated with the selected outbound communication group.

23. The machine-readable medium of claim 22, wherein
during the other range of time, the obtaining one of the call records prioritizes call records for which a failure of an outbound communication session was detected during the first range of time.

24. The machine-readable medium of claim 20, wherein
each of the call records is associated with a respective one of the of outbound communication groups of call records, based upon a telephone area code or a street address included in the call record.

25. The machine-readable medium of claim 20, wherein selecting the outbound communication group of call records is further based on weightings associated with each of the plurality of outbound communication groups.

26. The machine-readable medium of claim 20, the instructions causing the machine to perform operations further comprising:
- selecting a project from a plurality of projects, each project having an associated plurality of outbound communication groups, wherein
- the plurality of outbound communication groups is the plurality of outbound communication groups associated with the selected project.

* * * * *